United States Patent [19]

Edwards

[11] 4,378,451

[45] Mar. 29, 1983

[54] HIGH FLOW RATE POLYOLEFIN EXTRUSION COATING COMPOSITIONS

[75] Inventor: Ray Edwards, Henderson, Tex.

[73] Assignee: Eastman Kodak Company, Rochester, N.Y.

[21] Appl. No.: 301,921

[22] Filed: Sep. 14, 1981

[51] Int. Cl.³ .................. C08L 23/06; C08L 23/12; C08L 23/16
[52] U.S. Cl. .................................. 525/240; 525/198
[58] Field of Search ........................................ 525/240

[56] References Cited

U.S. PATENT DOCUMENTS

| | | | |
|---|---|---|---|
| 3,247,290 | 4/1966 | Werkman et al. | 525/240 |
| 3,418,396 | 12/1968 | Edwards et al. | 525/240 |
| 3,420,916 | 1/1969 | Liu et al. | 525/240 |
| 3,607,987 | 9/1971 | Walton et al. | 525/240 |
| 4,282,076 | 8/1981 | Boynton | 525/240 |

*Primary Examiner*—Carman J. Seccuro
*Attorney, Agent, or Firm*—Clyde L. Tootle; Daniel B. Reece, III

[57] ABSTRACT

This invention relates to novel blends containing degraded crystalline polypropylene or propylene containing copolymer useful as extrusion coating compositions which provide coatings having good coatability and good heat sealability. These coated substrates then can be used in fabricating bags and other packaging applications. Particularly, these coatings are a blend of a degraded crystalline polypropylene, or propylene containing copolymer, and low density polyethylene.

21 Claims, No Drawings

HIGH FLOW RATE POLYOLEFIN EXTRUSION COATING COMPOSITIONS

This invention relates to novel degraded polyolefin containing blends useful as extrusion coatings which provide coatings having good coatability and good heat seal strength. One aspect of this invention relates to a blend containing a degraded crystalline polypropylene or propylene copolymer and low density polyethylene which is capable of providing extrusion coatings having good coatability, adhesion and good heat seal strength. Another specific aspect of this invention is an extrusion coating which contains degraded crystalline polypropylene or propylene copolymer and low density polyethylene which coating when applied to substrates has good adhesion to the substrate as well as other good physical properties such as excellent heat seal strength.

Extruding a coating of a polyolefin or blends of polyolefins onto a substrate, such as paper or aluminum foil, to form an extrusion coated substrate is well known in the art. Various polyethylenes and blends of polyethylenes and other polyolefins have been widely used as extrusion coating compositions. However, a polyolefin such as crystalline polypropylene alone, regardless of its molecular weight (flow rate), is not a satisfactory extrusion coating material since it does not have high speed coating ability or a wide range of coating weights. Therefore, many of its excellent physical properties cannot be utilized in extrusion coating applications. In order to improve the coating properties of polypropylene, blends of polyethylene and polypropylene were used as extrusion coating compositions. Note, for example, U.S. Pat. No. 3,418,396 which describes and claims blends of polypropylene and polyethylene having excellent extrusion coating properties. Although the blends disclosed in U.S. Pat. No. 3,418,396 are useful in many applications, they have the disadvantage that such blends when applied as coatings to substrates, such as paper, do not provide the necessary heat seal strength for preparing certain packaging materials. Moreover, at the present time, there are no coating formulations available commercially that can be used to provide extrusion coatings which will provide both good coatability and a heat seal strength greater than about 5 pounds per linear inch. Therefore, it would be an advance in the state of the art to provide an extrusion coating composition that could be applied to substrates at commercially acceptable coatability speeds, which provide coatings having good adhesion to the substrate and have heat seal strengths greater than 10 pounds per linear inch.

In accordance with this invention, polyolefin extrusion coating compositions are provided which provide coatings having good coatability, i.e., greater than 0.6 mil thickness at 700 ft./min., and good heat seal strengths of at least 10 pounds per linear inch. Such compositions are obtained from a blend of a degraded crystalline polypropylene or propylene containing copolymer and low density polyethylene. These extrusion coating compositions provide a composition that has excellent adhesion to the substrate, provides coatings of less than 1 mil thickness at commercially acceptable speeds and have seal strengths of at least 10 pounds per linear inch. Such properties are necessary in the construction of some packaging materials, such as retortable food pouches, which the FDA requires to have heat seal strength of at least 15 pounds per linear inch. It was therefore surprising that such unexpected results were obtained with the blends of the present invention since a blend containing the undegraded crystalline polypropylene or propylene copolymer and low density polyethylene did not have a heat seal strength greater than about 5 pounds per inch. These unique blend compositions with which this invention is concerned are as follows:

| Component | Weight Percent Contained in Composition | |
|---|---|---|
| | Broad Range | Preferred Range |
| Degraded Propylene Homo- or Copolymer | 75–95% | 80–90% |
| Low Density Polyethylene | 5–25% | 10–20% |

These blends provide excellent coatings on substrates, such as paper stock or primed aluminum foil which can be used for retortable food packages. Such uses require the coating to substrate to have a high bond strength to be useful in fabricating food packages where handling or flexibility is encountered. Depending on the end use such coated substrates should also desirably have good adhesion, flexibility, barrier properties and heat resistance. For example, retortable food storage pouches need sufficient adhesion strength to be handled during filling of the pouch, during preparation and storage and subsequent heat seal resistance during immersion in boiling water and subsequent handling.

The degraded crystalline polypropylene or propylene copolymer component has a final melt flow rate of about 5 to 55 dg/m at 230° C. and is prepared by degrading low flow rate polymers and copolymers prepared with stereospecific catalyst by processes well known to the art. The crystalline polypropylene having a flow rate of 1 to 2 is degraded to a flow rate of about 10 to 40. A crystalline propylene/ethylene copolymer having a flow rate of 3 or less is degraded to a flow rate of 5 to 55. Such undegraded crystalline propylene containing polymers can be the commercially available crystalline polypropylene, crystalline polypropylene prepared according to U.S. Pat. No. 3,679,775, or crystalline propylene containing copolymers prepared according to U.S. Pat. No. 3,529,037. Particularly useful are crystalline polypropylenes and crystalline ethylene/propylene copolymers containing less than 5 weight percent ethylene.

The polypropylene and propylene containing copolymers can be degraded either thermally or by the use of free radical sources such as peroxides. These processes for degrading low flow rate polymers to prepare high flow rate degraded materials are conventional and well known in the art.

The low density polyethylene component must have a melt index at 190° C. of 0.5 to 4.5, preferably about 3.5, a density of above about 0.916 to 0.925 and a melt index recovery of greater than about 40, preferably 50 or greater, most preferred about 70. Such polyethylenes useful in this invention are prepared by methods known to the art.

The blends of degraded propylene homo and copolymers and low density polyethylene have a flow rate of from about 5 to about 55. Blends having a flow rate of less than 5 do not coat at commercially acceptable speeds due to edge tear and surging. Blends having a flow rate greater than 55 also do not coat at commercially acceptable speeds due to streaking and excessive neck-in.

The amount of polyethylene contained in the blends can be from 5% to 25%. The blends containing degraded crystalline polypropylene can preferably contain 5% to 15% polyethylene. Such degraded polypropylene blends which contain more than 15% polyethylene start to be deficient in heat seal strength. For example, one such blend of degraded polypropylene and polyethylene blends containing 20% polyethylene has good coatability but has a loss in heat seal strength. On the other hand, blends of degraded propylene/ethylene copolymer and polyethylene preferably contain 15% to 25% low density polyethylene. Such copolymer blends containing less than 15% low density polyethylene have a loss of coatability, i.e., less than 700 ft./min. Blends having more than 25% low density polyethylene have good coatability but a loss in heat seal strength. For example, one such degraded copolymer blend containing 30% low density polyethylene has a noticeable loss in heat seal strength and one such blend containing 10% polyethylene has a noticeable loss in coatability, i.e., less than 700 ft./min.

The compositions of the invention may be prepared in various ways such as dry blending and then passing through a compounding extruder, compounding on a milling roll or in a Banbury mixer or by fusion. Any method whereby the components can be blended together will produce the desired blend. For example, pellets of each polymer are blended mechanically and the blend is fed to an extruder wherein it is fused and extruded.

Additives, stabilizers, fillers and the like can be added to the compositions of the present invention. Preferably, these coating compositions should have some thermal stabilization due to the coatings being applied at elevated temperatures. Such materials can be present in the components forming the polymer blend, or may be added when the polymers are blended to form the extrusion coating composition.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A polyethylene-degraded polypropylene blend having a flow rate of 30 at 230° C. (ASTM D-1238) was prepared by blending 90% by weight of peroxide degraded polypropylene having a 35 flow rate at 230° C. (ASTM D-1238) with 10% by weight of polyethylene having a melt index of 3.5 dg/min at 190° C. (ASTM D-1238), density of 0.917 g/cc (ASTM D-1505), and a melt index recovery of 70. Melt index recovery is defined as the increase in the diameter of the extrudate over that of the orifice of the extrusion plastometer in ASTM Designation D1238-62T. The diameter of the specimen is measured in the area between 1/16 inch and ⅜ inch of the initial portion of the specimen as it emerges from the extrusion plastometer. Measurements are made by standard methods per ASTM Designation D-374. This blend of materials was evaluated as follows: each component was fed to a 3½-inch Egan extruder having a barrel length to diameter ratio of 24:1. The four zones of the extruder were maintained, from back to front, at 400° F., 500° F., 580° F., and 630° F. A metering type screw having six compression flights, and 12 metering flights were used. Prior to entering the die the melt passed through one screen of 24×24 mesh. The die was an Egan die, center-fed with 1-inch long lands, with an opening of 16″×0.020″. The temperature of the die was held at 580° F. The extrusion rate was held constant at 160 pounds per hour. The resulting film extrudate was passed through a 4½-inch air gap into the nip formed by a rubber-covered pressure roll and a chill roll. At the same time, 40 pound kraft paper stock 16 inches wide was fed into the nip with the pressure roll in contact with the foil. The nip pressure applied was 110 pounds per linear inch. The chill roll was a 24-inch diameter matte finish steel roll, water cooled to maintain a temperature of 60° F. on the roll. The coated paper was taken off the chill roll at a point 180° from the nip formed by the pressure roll and chill roll. The chill roll was operated at linear speeds of about 160 to greater than 700 feet per minute which is the accepted target range for commercial extrusion coatings. For example, at a coating speed of 700 feet per minute the paper stock had a coating of about 0.6 mils. The coating had an excellent adhesion to the paper stock. The coated paper had a heat seal strength of 18 pounds per linear inch using a tensile tester at a jaw separation rate of 10 inches/minute when sealed at a temperature of 500° F. using a conventional bar sealer.

EXAMPLE 2

An extrusion coating composition was prepared and tested according to Example 1 except that 20% polyethylene, and 80% degraded crystalline polypropylene were used. The heat seal strength of this coated paper was 12 pounds per linear inch. The composition was extrusion coated satisfactorily. This example shows that increasing the polyethylene level to 20% provides a useful extrusion coating composition but the heat seal strength is adversely affected.

EXAMPLE 3

An extrusion coating composition was prepared and tested according to Example 1 except that 30% polyethylene and 70% degraded crystalline polypropylene were used. The composition was extrusion coated to kraft paper satisfactorily. However, the heat sealability of extrusion coating was only 7 pounds per linear inch. This example shows that using the high level of polyethylene and less than the preferred amount of degraded polypropylene lowers the heat sealability of the coated substrate below 10 pounds per linear inch.

EXAMPLE 4

An extrusion coating composition was prepared and tested according to Example 1 except that 20% polyethylene, and 80% of peroxide degraded crystalline propylene/ethylene copolymer having a flow rate of 30, and an ethylene content of about 1.2 percent by weight, were used. The composition was extrusion coated to primed aluminum foil satisfactorily. The heat seal strength of this coating was 19 pounds per linear inch and at coatability speeds of greater than 1300 feet per minute provided coatings of less than 0.5 mils. This example shows that a peroxide degraded propylene/ethylene copolymer can be used in place of polypropylene to provide acceptable coatings.

EXAMPLE 5

An extrusion coating composition was prepared and tested according to Example 1 except that 30% polyethylene and 70% degraded ethylene/propylene copolymer were used. The composition coated satisfactorily on kraft paper at 1200 feet per minute at 0.4 mils but the heat seal strength was only 6 pounds per linear inch. This shows good coatability but the coating has a heat seal strength of less than 10.

EXAMPLE 6

An extrusion coating composition was prepared and tested according to Example 1 except that 3% polyethylene and 97% degraded polypropylene were used. The composition coated at only 100 feet per minute with a heat seal strength of 20 pounds per linear inch. This shows that the blend coatability is not commercially acceptable.

EXAMPLE 7

An extrusion coating composition was prepared and tested according to Example 1 except that 3% polyethylene and 97% degraded ethylene/propylene copolymer were used. The composition coated at only 100 feet per minute with a heat seal strength of 20 pounds per linear inch. This shows that the blend coatability is not commercially acceptable.

EXAMPLE 8

An extrusion coating composition was prepared and tested according to Example 1 except that thermally degraded polypropylene having a flow rate of 11 was used in place of the peroxide degraded polypropylene of Example 1. The blend had a flow rate of 10 and coated satisfactorily and the coating had a heat seal strength of 26 pounds per linear inch. This example shows that thermally degraded components and peroxide degraded components are interchangeable.

The invention has been described in detail with particular reference to preferred embodiments thereof, but it will be understood that variations and modifications can be effected within the spirit and scope thereof.

I claim:

1. An extrusion coating composition having a flow rate of 5 to 55 dg/min. at 230° C. which provides coatings of less than 1 mil which have heat seal strengths of at least 10 pounds per linear inch comprising a blend of: (1) about 75 to 95 percent, by weight, of at least one degraded crystalline polypropylene or propylene containing copolymer having a melt flow rate of 5 to 55 dg/min. at 230° C., and (2) about 5 to 25 percent, by weight, of at least one polyethylene having a density of 0.916 to 0.925, a melt index at 190° C. of 0.5 to 4.5, and a melt index recovery of greater than 40.

2. An extrusion coating composition according to claim 1 wherein said degraded crystalline polypropylene or propylene containing copolymer is crystalline polypropylene.

3. An extrusion coating composition according to claim 2 wherein said degraded crystalline polypropylene has a melt flow rate of 35 at 230° C.

4. An extrusion coating composition according to claim 2 wherein said low density polyethylene has a melt index of 3.5 dg/min. at 190° C., a density of 0.917 g/cc, and a 70 melt index recovery.

5. An extrusion coating composition according to claim 1 wherein said degraded crystalline polypropylene or propylene containing copolymer is crystalline ethylene/propylene copolymer containing less than 5 weight percent ethylene.

6. An extrusion coating composition according to claim 5 wherein said degraded crystalline ethylene/propylene copolymer has a melt flow rate of 30 at 230° C.

7. An extrusion coating composition according to claim 5 wherein said low density polyethylene has a melt index of 3.5 dg/min. at 190° C., a density of 0.917 g/cc, and a 70 melt index recovery.

8. An extrusion coating composition having a melt flow rate of 5 to 55 dg/min. at 230° C. which provides coatings of less than 1 mil which have heat seal strengths of at least 10 pounds per linear inch comprising a blend of: (1) about 80 to 90 percent, by weight, of at least one degraded crystalline polypropylene or propylene containing copolymer having a melt flow rate of 5 to 55 dg/min. at 230° C., and (2) about 10 to 20 percent, by weight, of at least one polyethylene having a density of about 0.916 to about 0.925, a melt index at 190° C. of 0.5 to 4.5, and a melt index recovery of greater than 40.

9. An extrusion coating composition according to claim 8 wherein said degraded crystalline polypropylene or propylene containing copolymer is crystalline polypropylene.

10. An extrusion coating composition according to claim 9 wherein said degraded crystalline polypropylene has a melt flow rate of 35 at 230° C.

11. An extrusion coating composition according to claim 9 wherein said low density polyethylene has a melt index of 3.5 dg/min. at 190° C., a density of 0.917 g/cc, and a 70 melt index recovery.

12. An extrusion coating composition according to claim 8 wherein said degraded crystalline propylene containing copolymer is crystalline ethylene/propylene copolymer containing less than 5 weight percent ethylene.

13. An extrusion coating composition according to claim 12 wherein said degraded crystalline ethylene/propylene copolymer has a melt flow rate of 30 at 230° C.

14. An extrusion coating composition according to claim 12 wherein said low density polyethylene has a melt index of 3.5 dg/min. at 190° C., a density of 0.917 g/cc, and a 70 melt index recovery.

15. An extrusion coating composition having a melt flow rate of 30 dg/min. at 230° C. which provides coatings of less than 1 mil which have heat seal strengths of at least 10 pounds per linear inch comprising a blend of: (1) about 90 percent, by weight, of at least one degraded crystalline polypropylene or propylene containing copolymer having a melt flow rate of 30 to 35 dg/min. at 230° C., and (2) about 10 percent, by weight, of at least one polyethylene having a density of about 0.917, a melt index at 190° C. of 3.5, and a melt index recovery of 70.

16. An extrusion coating composition according to claim 15 wherein said degraded crystalline polypropylene or propylene containing copolymer is crystalline polypropylene.

17. An extrusion coating composition according to claim 16 wherein said degraded crystalline polypropylene has a melt flow rate of 35 at 230° C.

18. An extrusion coating composition according to claim 17 wherein said low density polyethylene has a melt index of 3.5 dg/min. at 190° C., a density of 0.917 g/cc, and a 70 melt index recovery.

19. An extrusion coating composition according to claim 15 wherein said degraded crystalline propylene containing copolymer is crystalline ethylene/propylene copolymer containing less than 5 weight percent ethylene.

20. An extrusion coating composition according to claim 19 wherein said degraded crystalline ethylene/propylene copolymer has a melt flow rate of 30 at 230° C.

21. An extrusion coating composition according to claim 20 wherein said low density polyethylene has a melt index of 3.5 dg/min. at 190° C., a density of 0.917 g/cc, and a 70 melt index recovery.

* * * * *